March 21, 1961     V. B. HOSTETLER     2,975,477
CAPSULE MACHINE DIPPING PAN

Filed Jan. 19, 1959     2 Sheets-Sheet 1

INVENTOR.
VAN B. HOSTETLER

ATTORNEYS

United States Patent Office 2,975,477
Patented Mar. 21, 1961

2,975,477

CAPSULE MACHINE DIPPING PAN

Van B. Hostetler, Indianapolis, Ind., assignor to Eli Lilly and Company, Indianapolis, Ind., a corporation of Indiana Filed Jan. 19, 1959, Ser. No. 787,564

6 Claims. (Cl. 18—25)

This invention relates to capsule machines for making hard or telescoping, cap and body type capsules, and more particularly, to improvements in the capsule-mold-pin dipping pans of such machines.

The mold pins of such capsule making machines are dependently supported in a row upon elongate bars, and a group of such bars is arranged to be lowered and raised so as to immerse the pins into and withdraw the pins from a dipping pan containing capsule-forming material such as gelatin, methylcellulose or the like, whereby films of said material are deposited by adhesion upon the pins. These films, after setting and being kiln-dried are stripped from the pins, trimmed longitudinally to size and become the capsule cap and body shells. Apparatus of this general character is disclosed in U.S. Patents Nos. 943,608, granted on December 14, 1909, to Burton W. Scott, and 1,787,777, granted on January 6, 1931, to Arthur Colton, respectively.

Heretofore, the molten, viscous body of capsule-forming material has been fed from a supply reservoir to a dipping pan having a top which is fully open and which presents a relatively broad and expansive surface area of the capsule-forming material. The capsule-forming material has been sought to be maintained homogeneous throughout its mass solely by constantly recirculating it through pump means communicating from the reservoir to the dipping pan, a fluid-containing jacket surrounding the pump and dipping pan being provided to maintain the material at a controlled temperature. As the supply of capsule-forming material was diminished in volume through evaporation from the broad, expansive surface area of the pan and the constant withdrawal thereof in the form of films adhering to the mold pins, it was replenished from time to time with fresh material by a controlled valving mechanism, the fresh, newly-added-material usually being of a viscosity less than that already contained in the reservoir.

The capsule-forming materials heretofore mentioned, inherently, have physical characteristics conducive to the formation of layers or striae of varied viscosities throughout their bodies irrespective of the precision of temperature control maintained in the jacket surrounding the dipping pan and irrespective of the speed of operation of the pump. The introduction of the less viscous replenishment material at periodic intervals as previously mentioned, augmented by the inherent tendencies of the materials to laminate, results in marked variations in viscosity and homogeneity throughout the body of the materials in the supply reservoir and in the dipping pan.

These variations in viscosity and homogeneity have contributed in large measure to the problem of obtaining films of uniform thickness upon the mold pins as they are immersed at different points along the surface and withdrawn from the body of the capsule-forming materials. Another factor contributing to variations in the wall thicknesses of films adhering to the pins is the distortion or turbulence created upon the surface and in the body of the liquid by the immersion and withdrawal movements of the relatively closely spaced pins themselves, i.e., one pin affects the evenness of deposition of the capsule-forming material upon a next adjoining pin by creating turbulence either upon the surface or in the body of the capsule-forming material, and in the immediate vicinity of said next-adjoining pin.

As is well known, finished, empty capsules of the type referred to are fed from a supply hopper in groups into automatic filling machines where the caps are disjoined from the bodies, the latter filled with a powdered substance and the caps rejoined upon the bodies. Variations in wall thickness in the caps and the bodies cause misoperation of the filling machines by their being introduced in an askew position into or becoming jammed in the apertures of the dies of such machines. This greatly interferes with the smooth, continuous, high speed production of filling machines. Accordingly, it is highly desirable that the capsule caps and bodies be of uniform wall thickness throughout and that the wall thicknesses be held to relatively close toleranecs to obviate these difficulties.

It is an object of the present invention to provide an improved dipping pan for a capsule making machine which is so arranged and constructed as to increase the uniformity in the wall thickness of the capsule forming films deposited upon the capsule mold pins.

More specifically, it is an object of the invention to provide an improved capsule-mold-pin dipping pan in which there is provided a series of compartments, one for each pin, whereby a more thorough, constant and continuous division and reuniting of the capsule-forming material is effected to constantly maintain a greater homogeneity throughout the mass of such material.

A further object of the invention is to provide an improved dipping pan wherein each capsule pin has its own individual dipping cell therein whereby any distortion or turbulence-creating effect upon the surface or in the body of the capsule-forming material is oriented and restricted specifically to each individual pin, i.e., distortion to the surface of or in the body of the capsule-forming material created by one capsule mold pin is prevented from effecting a variation in film thickness of material deposited upon a neighboring pin.

With these and incidental objects in view, the invention consists in certain novel features of construction and combinations of parts, the essential elements of which are set forth in appended claims, and a preferred embodiment of which is hereinafter described with reference to the drawings which accompany and form part of this specification.

Figure 3:
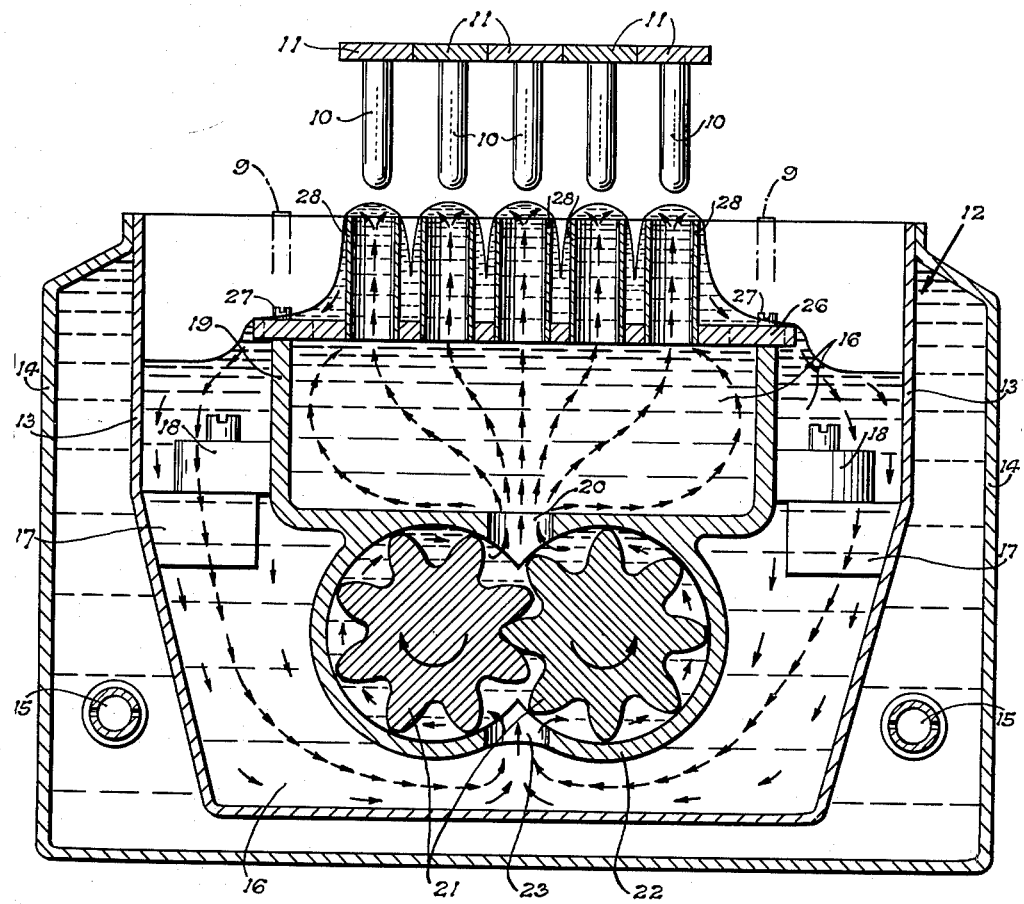
Fig. 3 is a transverse cross sectional elevation thereof taken along the line 3—3 of Fig. 1.

Referring to the drawings, the capsule mold pins 10 are shown in Fig. 3. There is a series of such pins 10 dependently affixed to each bar 11. Groups of such pin-carrying bars 11 are arranged through mechanism such as disclosed in the aforementioned patents to lower and raise pins 10 into and out of a dipping pan generally indicated at 12.

Figure 1:
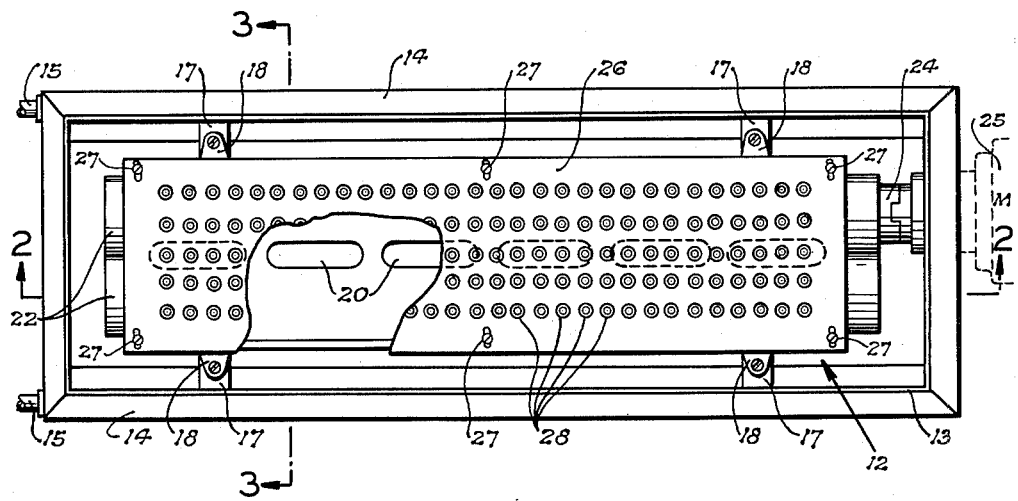
Fig. 1 is a top plan view of the improved capsule-mold-pin dipping pan.
Figure 2:
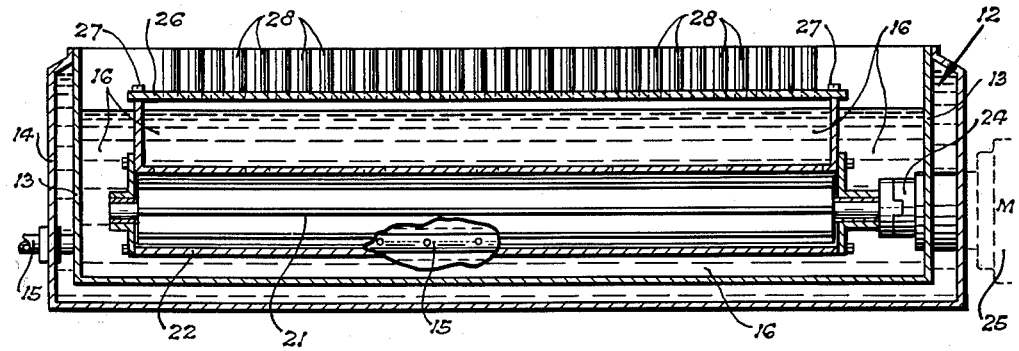
Fig. 2 is a longitudinal, sectional elevation thereof taken substantially along the line 2—2 of Fig. 1.

Dipping pan 12 comprises a reservoir or container 13 which is surroundingly encased by a jacket or housing 14. Suitable inlet and outlet tubes 15 communicating with housing 14 introduce therein and carry therefrom steam, hot water or a coolant fluid for maintenance of the temperature of the capsule-forming material 16 which is contained in reservoir 13. Internally of reservoir or container 13 there are provided four inwardly projecting, spaced-apart lugs 17 to which are secured four corresponding, outwardly, projecting spaced-apart lugs 18 formed integrally with a dipping pan 19. The dipping pan or section 19 through a series of elongated ports 20 provided in the bottom thereof communicates with a gear pump 21 housed within a chamber 22 formed integrally with the lower portion of dipping pan 19. The bottom of chamber 22 is ported as at 23 (Fig. 3) to provide free communication with reservoir 13. One of the gears of gear pump 21 is connected as at 24 (Figs. 1 and 2) to an operating motor 25. Upon operation of motor 25, gear pump 21 is driven to pump the capsule-forming material 16, such as gelatin, methylcellulose, or the like through ports 23 and 20 into dipping pan 19. Heretofore, in previous constructions of such dipping pans, the upper end and side edges of the pans have terminated in a plane substantially flush with the upper edge of reservoir 13 as indicated by dot and dash lines at 9 in Fig. 3, the ends and side walls of the upper edges of the pan forming a weir over which the molten, viscous capsule-forming material 16 flowed back into reservoir 13. In such previous constructions a continuous broad and expansive surface area of capsule-forming material was presented to evaporative influence and to the group of pins to be dipped thereinto and such surface afforded opportunity for creation of turbulence in the surface and body of material by adjoining pins during dipping and withdrawal operations.

In the present construction the upper edge of dipping pan 19 terminates a substantial distance below the upper edge of reservoir 13 and has affixed thereover a plate 26 as by means of screws 27. A series of individual, upstanding tubes 28 is secured in plate 26, there being one tube for each pin 10 and each tube has its lower end communicating with material 16 in dipping pan 19. The upper ends of the tubes terminate substantially flush with the upper edge of reservoir 13 and each tube is of such diameter as to accommodate with adequate clearance its corresponding pin 10, and is in axial alignment therewith. In this construction, as gear pump 21 is operated, the capsule-forming material 16 is constantly and continuously circulated from reservoir 13 through the gear pump into dipping pan 19 upwardly through the individual tubes 28, over the individual weirs formed by their upper peripheries and thence flows back into the supply reservoir 13. In this manner, the capsule-forming material 16 is constantly and continuously broken up and divided by the tubes 28 and, after passing out of the tubes, returns by gravity to reunite with the mass or body of material contained in reservoir 13. Such constant, continuous redivision and reuniting of the material makes for the maintenance of greater homogeneity at the surface and throughout the body thereof. Additionally, as the mold pins 10 are lowered into the capsule-forming material 16 the aligned, individual, corresponding tubes 28 which spacedly surround their corresponding pins 10 shield and prevent any turbulence or distortion to the surface or body of the capsule-forming material 16 with respect to an adjoining pin as the pins as a group are lowered into and withdrawn therefrom. By controlling the speed of operation of gear pump 21, the flow of capsule-forming material 16 through tubes 28 may be made to correspond with the rate of travel of the pins 10 during their ascent or withdrawal movement from their corresponding tubes. By such construction there is achieved a greater homogeneity in the body or mass of capsule-forming material 16 through the constant redivision and reuniting of such material, each capsule mold pin is shielded from any possible turbulence-creactive effect of an adjoining pin and hence a greater uniformity of wall thickness of the films adhering to pins 10 is effected irrespective of the addition from time to time of replenishment material of lower viscosity to the general body of capsule-forming material 16.

It will be understood that the division of the capsule dipping pan 19 into a series of individual cells corresponding to capsule mold pins 10 by means of plate 26 and its series of upstanding, corresponding tubes 28 is illustrative only and that such individual, cellular construction or compartmentalization could be achieved by any appropriate subdivision means other than tubular elements 28.

I claim:

1. In a capsule making machine including a pump means, a capsule mold pin dipping pan and a series of capsule mold pins arranged to be dipped and withdrawn from said pan; said dipping pan comprising a reservoir for containing a supply of capsule-forming material; a dipping section superposed thereover and communicating with said reservoir, said pump means being associated with said reservoir and operable to continuously circulate said material from said reservoir into and through said dipping section and back into said reservoir; said dipping section being sectionally divided into a corresponding series of spaced apart, individual compartments each adapted to receive with clearance a corresponding individual capsule mold pin; each of said compartments being effective to direct the flow of capsule forming material upwardly around its individual and corresponding mold pin as the latter is immersed thereinto and withdrawn therefrom and being effective also to shield each pin from any distortive, turbulation-creating influence by a neighboring pin upon the surface or in the body of said capsule-forming material during the dipping and withdrawal of said pins.

2. In a dipping pan for a capsule making machine of the type wherein a series of capsule mold pins carried by a bar is immersed in and withdrawn from a body of capsule-forming material said dipping pan having a supply reservoir of said capsule-forming material, a dipping section thereover, means for controlling the temperature of said material in said reservoir and said dipping section and pump means associated with said reservoir and said dipping section for constantly circulating said material from said supply reservoir to said dipping section; that improvement which consists in providing means in said dipping section for compartmentalizing said section into a series of individual cells corresponding in number to and in axial alignment with said series of pins to be immersed, whereby said capsule-forming material as it is pumped from said reservoir into said dipping section is continuously divided from its main body in said reservoir into seperate, vertically disposed, columns each moving in a direction corresponding to the direction of withdrawal of said pins.

3. In a dipping pan for a capsule making machine of the type wherein groups of bars each having a series of capsule mold pins are moved to immerse the pins in and withdraw the pins from a body of capsule forming material; said dipping pan having a supply reservoir of said capsule forming material, a dipping section thereover, means for controlling the temperature of said material in said reservoir and said dipping section and jump means associated with said reservoir and said dipping section for constantly circulating said material from said supply reservoir to said dipping section; that improvement which consists in providing means in said dipping section for compartmentalizing said section into a series of individual cells corresponding in number to and in axial alignment with said series of pins to be immersed whereby said capsule forming material as it is pumped from said reservoir into said dipping section is continuously divided from its main body in said reservoir into separate, vertically disposed, columns each moving in a direction corresponding to the direction of withdrawal of said pins.

4. In a dipping pan for a capsule making machine of the type wherein a bar having a series of capsule mold pins is moved to immerse the pins in and withdraw the pins from a body of capsule-forming material; said dipping pan having a supply reservoir of said capsule forming material, a dipping section thereover, means for controlling the temperature of said material in said reservoir and said dipping section and pump means associated with said reservoir and said dipping section for constantly circulating said material from said supply reservoir to said dipping section; that improvement which consists in providing means in said dipping section for compartmentalizing said section into a series of individual cells in axial alignment with and corresponding in number to said series of pins to be immersed whereby said capsule forming material as it is pumped from said reservoir into said dipping section is continuously divided from its main body into separate, vertically disposed, columns each moving in a direction corresponding to the direction of withdrawal of said pins and then reunited with said main body, and said pump means being operable to control the rate of upward flow of said columns in correspondence to the rate of withdrawal of said pins from said columns.

5. In a dipping pan for a capsule making machine of the type wherein a series of capsule mold pins is immersed in and withdrawn from a body of capsule-forming material; said dipping pan having a supply reservoir of said capsule forming material, a dipping section thereover communicating with said reservoir, means for controlling the temperature of said material in said reservoir and said dipping section, pump means associated with said reservoir and said dipping section for constantly circulating said material between said supply reservoir to said dipping section; that improvement which consists in dividing said dipping section by a series of vertically disposed tubular members, one for each of said pins to be immersed therein, each of said tubular members being of greater diameter than and in corresponding, spaced axial alignment with said pins whereby said capsule-forming material as it is pumped from said supply reservoir into said dipping section may be moved at a constant rate in a series of vertical columns through said tubular members and in a direction of flow corresponding to the direction of withdrawal of said pins to effect deposition by adhesion of films of capsule forming material upon each of said pins completely uninfluenced by any movement of the surface or body of said capsule-forming material by an adjacent capsule mold pin during its immersion or withdrawal from said capsule-forming material.

6. An improved dipping pan for capsule making machines comprising a supply reservoir containing a body of capsule-forming material; a dipping section for receiving by immersion therein and withdrawal therefrom a series of spacedly, supported capsule mold pins; said dipping section being superposed over and communicating with said reservoir; means for continuously pumping said material from said reservoir into said dipping section; tubular means divisionally compartmentalizing said dipping section in correspondence individually, spacedly and axially with respect to the spacing of said pins whereby said capsule-forming material is continuously channeled upwardly separately from the main body thereof in said reservoir into and through said tubular compartments of said dipping section in a direction of flow corresponding to the movement of each of said pins in their respective compartments during their withdrawal movement therefrom and then returned to the main body of said material in said reservoir; said pumping means being operable to control the rate of flow of said material through said compartments with respect to the rate of travel of said pins during their withdrawal movement whereby the thickness of films of said material deposited by adhesion upon each of said pins is rendered completely independent of any turbulative influence by an adjacent pin upon the surface or body of said capsule-forming material.

References Cited in the file of this patent

UNITED STATES PATENTS

| Number | Name | Date |
|---|---|---|
| 1,774,453 | Raiche | Aug. 26, 1930 |
| 2,136,185 | Ferngren | Nov. 8, 1938 |
| 2,612,657 | Poulsen | Oct. 7, 1952 |
| 2,636,215 | Smith | Apr. 28, 1953 |
| 2,869,178 | Kath | Jan. 20, 1959 |